(12) United States Patent
Wigen et al.

(10) Patent No.: US 11,565,463 B2
(45) Date of Patent: Jan. 31, 2023

(54) ADDITIVELY MANUFACTURED HEATER

(71) Applicant: Rosemount Aerospace Inc., Burnsville, MN (US)

(72) Inventors: Scott Wigen, Eagan, MN (US); Greg Allen Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 239 days.

(21) Appl. No.: 17/075,327

(22) Filed: Oct. 20, 2020

(65) Prior Publication Data

US 2022/0118683 A1 Apr. 21, 2022

(51) Int. Cl.
| | |
|---|---|
| *B29C 64/118* | (2017.01) |
| *B33Y 10/00* | (2015.01) |
| *B33Y 30/00* | (2015.01) |
| *B33Y 80/00* | (2015.01) |
| *B29C 64/209* | (2017.01) |
| *B33Y 70/10* | (2020.01) |
| *B64D 15/12* | (2006.01) |
| *H05B 3/18* | (2006.01) |
| *B29K 101/12* | (2006.01) |

(Continued)

(52) U.S. Cl.
CPC .......... *B29C 64/118* (2017.08); *B29C 64/209* (2017.08); *B33Y 10/00* (2014.12); *B33Y 30/00* (2014.12); *B33Y 70/10* (2020.01); *B33Y 80/00* (2014.12); *B64D 15/12* (2013.01); *H05B 3/18* (2013.01); *B29K 2101/12* (2013.01); *B29K 2305/08* (2013.01); *B29L 2031/779* (2013.01); *H05B 2203/016* (2013.01); *H05B 2203/017* (2013.01); *H05B 2203/037* (2013.01)

(58) Field of Classification Search
CPC ..... B29C 64/118; B29C 64/209; B33Y 10/00; B33Y 30/00; B33Y 70/10; B33Y 80/00; B64D 15/12; H05B 3/18; B29K 2101/12; B29K 2305/08
See application file for complete search history.

(56) References Cited

U.S. PATENT DOCUMENTS

| | | |
|---|---|---|
| 2,984,107 A | 5/1961 | Strieby et al. |
| 4,357,526 A | 11/1982 | Yamamoto et al. |
| 5,127,265 A | 7/1992 | Williamson et al. |

(Continued)

FOREIGN PATENT DOCUMENTS

| | | |
|---|---|---|
| EP | 3133403 A1 | 2/2017 |
| GB | 2561393 A | 10/2018 |

(Continued)

OTHER PUBLICATIONS

Extended European Search Report for European Patent Application No. 19215832.7, dated Aug. 10, 2020, 8 pages.

(Continued)

*Primary Examiner* — Nahida Sultana
(74) *Attorney, Agent, or Firm* — Kinney & Lange, P.A.

(57) ABSTRACT

A method for forming a heater on a substrate includes feeding a heater wire into a heating zone, the heater wire being in contact with a dielectric material within the heating zone, and coaxially co-extruding the heater wire and the dielectric material from the heating zone through a nozzle and onto a substrate such that the heater wire and the dielectric material form a heater for heating the substrate.

14 Claims, 5 Drawing Sheets

(51) Int. Cl.
*B29K 305/08* (2006.01)
*B29L 31/00* (2006.01)

(56) References Cited

U.S. PATENT DOCUMENTS

| | | | |
|---|---|---|---|
| 5,628,565 | A | 5/1997 | Hagen et al. |
| 5,750,958 | A | 5/1998 | Okuda et al. |
| 6,049,065 | A | 4/2000 | Konishi |
| 6,070,475 | A | 6/2000 | Muehlhauser et al. |
| 6,236,027 | B1 | 5/2001 | Miyata et al. |
| 6,517,240 | B1 | 2/2003 | Herb et al. |
| 6,892,584 | B2 | 5/2005 | Gilkison et al. |
| 8,242,416 | B2 | 8/2012 | Lin et al. |
| 9,097,734 | B2 | 8/2015 | Seaton et al. |
| 9,126,365 | B1 * | 9/2015 | Mark .................. B29B 15/12 |
| 9,207,253 | B2 | 12/2015 | Seidel et al. |
| 9,664,542 | B2 | 5/2017 | Gordon et al. |
| 9,719,820 | B1 | 8/2017 | Jacob et al. |
| 10,197,588 | B2 | 2/2019 | Wong et al. |
| 10,234,475 | B2 | 3/2019 | Sarno et al. |
| 10,254,499 | B1 | 4/2019 | Cohen et al. |
| 10,494,107 | B2 | 12/2019 | Dardona et al. |
| 10,562,226 | B1 * | 2/2020 | Cohen .................. B29C 48/05 |
| 10,578,498 | B2 | 3/2020 | Parsons et al. |
| 10,605,637 | B2 | 3/2020 | Gordon et al. |
| 10,884,014 | B2 | 1/2021 | Golly et al. |
| 10,955,433 | B2 | 3/2021 | Jacob et al. |
| 2005/0199610 | A1 * | 9/2005 | Ptasienski .......... H05K 3/1241 219/539 |
| 2006/0054616 | A1 * | 3/2006 | Ptasienski ............ H05B 3/20 219/543 |
| 2007/0045477 | A1 | 3/2007 | Armstrong et al. |
| 2007/0108047 | A1 | 5/2007 | Chang et al. |
| 2010/0032292 | A1 | 2/2010 | Wang et al. |
| 2011/0240625 | A1 | 10/2011 | Takenouchi |
| 2012/0118076 | A1 | 5/2012 | Foster |
| 2013/0287378 | A1 | 10/2013 | Kida et al. |
| 2014/0042140 | A1 | 2/2014 | Lin et al. |
| 2014/0042149 | A1 | 2/2014 | Kamitani |
| 2014/0116154 | A1 | 5/2014 | Seidel et al. |
| 2014/0285943 | A1 | 9/2014 | Watanabe et al. |
| 2016/0280391 | A1 | 9/2016 | Golly et al. |
| 2016/0304210 | A1 | 10/2016 | Wentland et al. |
| 2017/0129616 | A1 | 5/2017 | Coat-Lenzotti et al. |
| 2018/0079525 | A1 | 3/2018 | Krueger et al. |
| 2018/0124874 | A1 | 5/2018 | Dardona et al. |
| 2018/0128849 | A1 | 5/2018 | Wong et al. |
| 2018/0160482 | A1 | 6/2018 | Hartzler et al. |
| 2018/0186460 | A1 | 7/2018 | Dardona et al. |
| 2018/0238723 | A1 | 8/2018 | Seidel et al. |
| 2018/0259547 | A1 | 9/2018 | Abdullah et al. |
| 2018/0281279 | A1 | 10/2018 | Barocio et al. |
| 2018/0372556 | A1 | 12/2018 | Parsons et al. |
| 2018/0372559 | A1 | 12/2018 | Parsons et al. |
| 2019/0001787 | A1 | 1/2019 | Takeuchi |
| 2019/0219611 | A1 | 7/2019 | Lyding et al. |
| 2019/0293676 | A1 | 9/2019 | Jacob et al. |
| 2020/0055582 | A1 | 2/2020 | Botura et al. |
| 2021/0055143 | A1 | 2/2021 | Wigen et al. |

FOREIGN PATENT DOCUMENTS

| | | | |
|---|---|---|---|
| KR | 20120069201 | A | 6/2012 |
| KR | 101184780 | B1 | 9/2012 |

OTHER PUBLICATIONS

Extended European Search Report for European Patent Application No. 21203409.4, dated Mar. 16, 2022, 8 pages.
Extended European Search Report for European Patent Application No. 20205705.5, dated Apr. 30, 2021, 10 pages.

* cited by examiner

ADDITIVELY MANUFACTURED HEATER

BACKGROUND

The present disclosure relates generally to heaters, and in particular, to heaters for air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which are often cold. As such, heaters are positioned within air data probes to ensure the air data probes function properly in liquid water, ice crystal, and mixed phase icing conditions. It can be difficult to form a heater for the air data probe.

SUMMARY

A method for forming a heater on a substrate includes feeding a heater wire into a heating zone, the heater wire being in contact with a dielectric material within the heating zone, and coaxially co-extruding the heater wire and the dielectric material from the heating zone through a nozzle and onto a substrate such that the heater wire and the dielectric material form a heater for heating the substrate.

A system for forming a heater onto a substrate includes a heating zone configured to heat a heater wire and a dielectric material and a nozzle connected to the heating zone. The heater wire and the dielectric material are coaxially co-extruded from the heating zone through the nozzle and onto the substrate to form a heater for heating the substrate.

DETAILED DESCRIPTION

In general, the present disclosure describes a heater that is additively manufactured onto an air data probe by coaxially co-extruding a heater wire along with a dielectric material onto a substrate of the air data probe, which results in a single-step process that is simpler and more cost-effective while allowing for more tailored heating.

Figure 1:
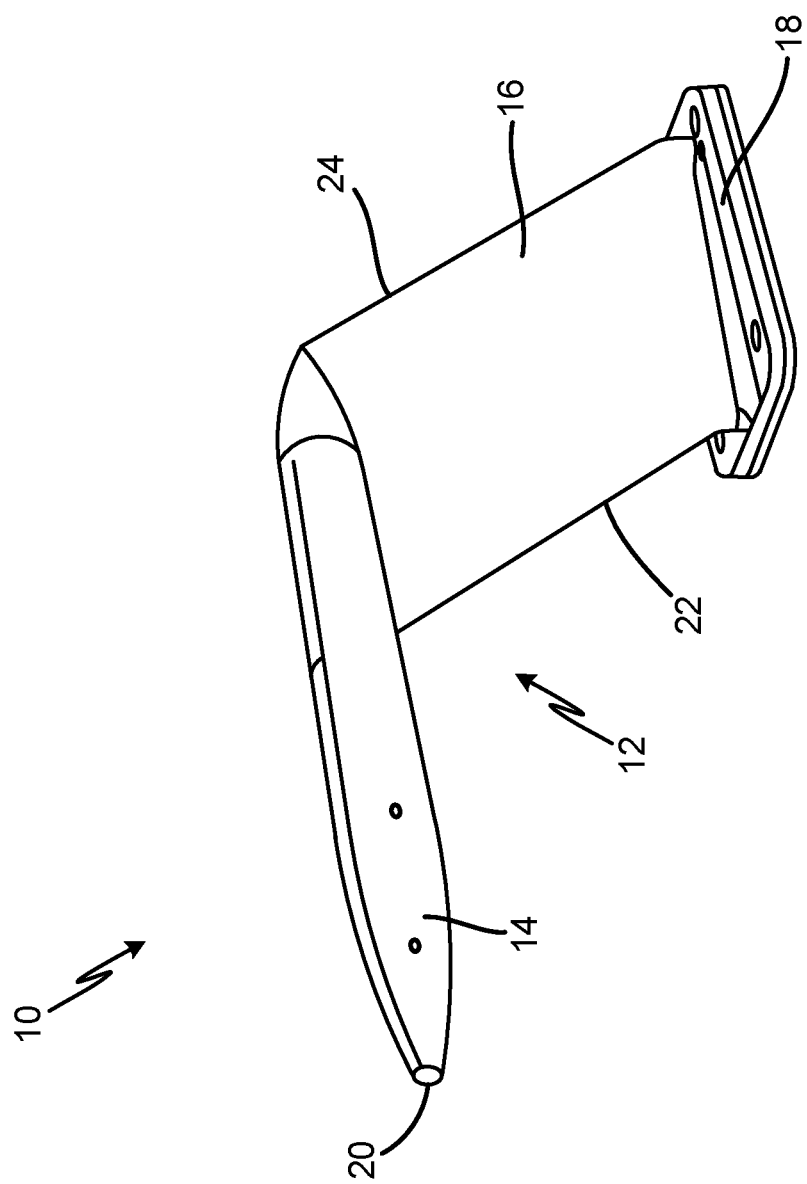
FIG. 1 is a perspective view of a pitot probe.
Figure 2:
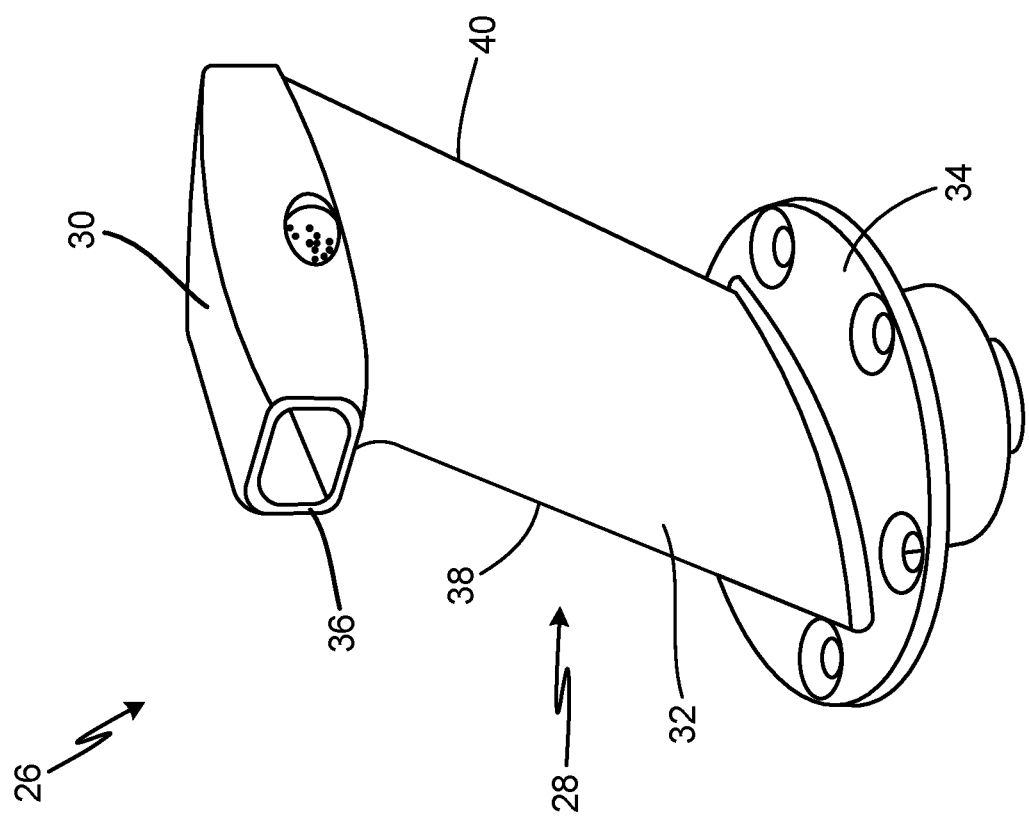
FIG. 2 is a perspective view of a total air temperature probe.
Figure 3:
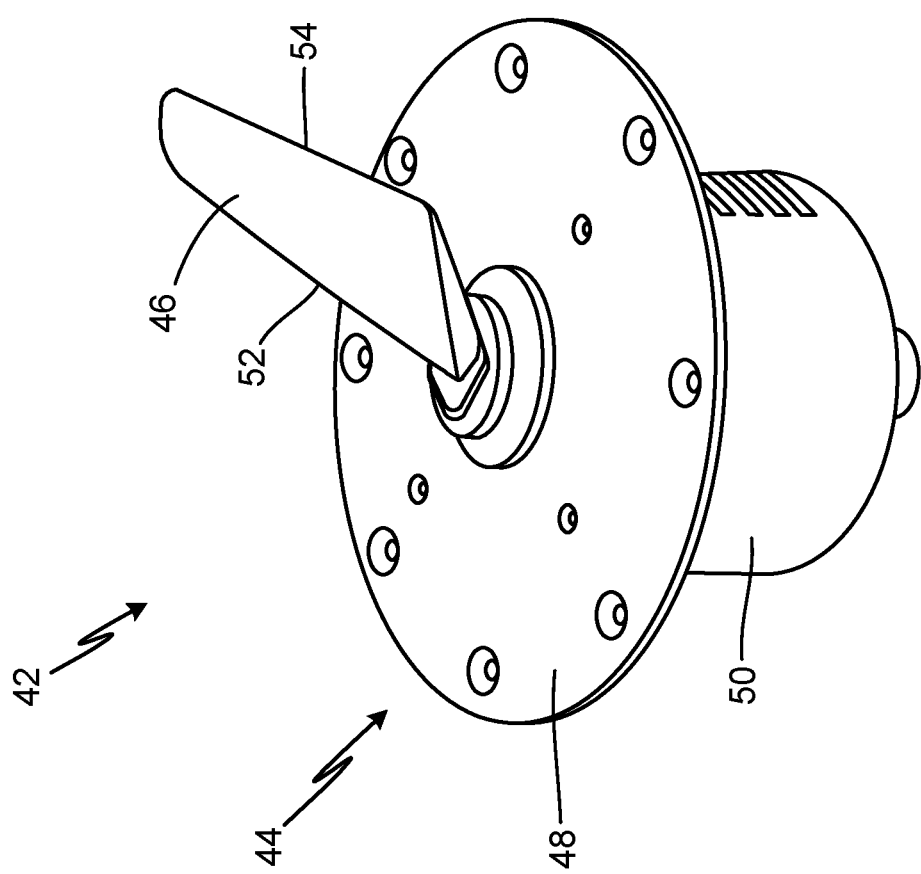
FIG. 3 is a perspective view of an angle of attack sensor.

The present disclosure relates to air data probes. FIGS. 1-3 illustrate examples of different air data probes. In FIG. 1, a pitot probe is discussed. In FIG. 2, a total air temperature probe is discussed. In FIG. 3, an angle of attack sensor is discussed. The present disclosure can be applied to any suitable air data probe.

FIG. 1 is a perspective view of pitot probe 10. Pitot probe 10 includes body 12, formed by probe head 14 and strut 16, and mounting flange 18. Probe head 14 includes tip 20. Strut 16 includes leading edge 22 and trailing edge 24.

Pitot probe 10 may be a pitot-static probe or any other suitable air data probe. Body 12 of pitot probe 10 is formed by probe head 14 and strut 16. Probe head 14 is the sensing head of pitot probe 10. Probe head 14 is a forward portion of pitot probe 10. Probe head 14 has one or more ports positioned in probe head 14. Internal components of pitot probe 10 are located within probe head 14. Probe head 14 is connected to a first end of strut 16. Probe head 14 and strut 16 make up body 12 of pitot probe 10. Strut 16 is blade-shaped. Internal components of pitot probe 10 are located within strut 16. Strut 16 is adjacent mounting flange 18. A second end of strut 16 is connected to mounting flange 18. Mounting flange 18 makes up a mount of pitot probe 10. Mounting flange 18 is connectable to an aircraft.

Probe head 14 has tip 20 at a forward, or upstream, portion of probe head 14. Tip 20 is at the end of probe head 14 opposite the end of probe head 14 connected to strut 16. Strut 16 has leading edge 22 at a forward, or upstream, side of strut 16 and trailing edge 24 at an aft, or downstream, side of strut 16. Leading edge 22 is opposite trailing edge 24.

Pitot probe 10 is configured to be installed on an aircraft. Pitot probe 10 may be mounted to a fuselage of the aircraft via mounting flange 18 and fasteners, such as screws or bolts. Strut 16 holds probe head 14 away from the fuselage of the aircraft to expose probe head 14 to external airflow. Probe head 14 takes in air from surrounding external airflow and communicates air pressures pneumatically through internal components and passages of probe head 14 and strut 16. Pressure measurements are communicated to a flight computer and can be used to generate air data parameters related to the aircraft flight condition.

FIG. 2 is a perspective view of total air temperature probe 26. Total air temperature probe 26 includes body 28, formed by head 30 and strut 32, and mounting flange 34. Head 30 includes inlet scoop 36. Strut 32 includes leading edge 38 and trailing edge 40.

Body 28 of total air temperature probe 26 is formed by head 30 and strut 32. Head 30 is connected to a first end of strut 32. Head 30 and strut 32 make up body 28 of total air temperature probe 26. Internal components of total air temperature probe 26 are located within strut 32. Strut 32 is adjacent mounting flange 34. A second end of strut 32 is connected to mounting flange 34. Mounting flange 34 makes up a mount of total air temperature probe 26. Mounting flange 34 is connectable to an aircraft.

Head 30 has inlet scoop 36, which is a forward portion of total air temperature probe 26. Inlet scoop 36 is an opening in a forward, or upstream, end of head 30. Strut 32 has leading edge 38 at a forward, or upstream, side of strut 32 and trailing edge 40 at an aft, or downstream, side of strut 32. Leading edge 38 is opposite trailing edge 40.

Total air temperature probe 26 is configured to be installed on an aircraft. Total air temperature probe 26 may be mounted to a fuselage of the aircraft via mounting flange 34 and fasteners, such as screws or bolts. Strut 32 holds head 30 away from the fuselage of the aircraft to expose head 30 to external airflow. Air flows into total air temperature probe 26 through inlet scoop 36 of head 30. Air flows into an interior passage within strut 32 of total air temperature probe 26, where sensing elements measure the total air temperature of the air. Total air temperature measurements of the air are communicated to a flight computer. Such measurements can be used to generate air data parameters related to the aircraft flight condition.

FIG. 3 is a perspective view of angle of attack sensor 42. Angle of attack sensor 42 includes body 44, formed by vane 46 and faceplate 48, and housing 50. Vane 46 includes leading edge 52 and trailing edge 54.

Body 44 of angle of attack sensor 42 is formed by vane 46 and faceplate 48. Vane 46 is adjacent faceplate 48. Vane 46 and faceplate 48 make up body 44 of angle of attack sensor. Faceplate 48 makes up a mount of angle of attack sensor 42. Faceplate 48 is connectable to an aircraft. Faceplate 48 is positioned on and connected to housing 50. Internal components of angle of attack sensor 42 are located within housing 50. Vane 46 has leading edge 52 at a forward, or upstream, side of vane 46 and trailing edge 54 at an aft, or downstream, side of vane 46. Leading edge 52 is opposite trailing edge 54.

Angle of attack sensor 42 is installed on an aircraft. Angle of attack sensor 42 may be mounted to a fuselage of the aircraft via faceplate 48 and fasteners, such as screws or bolts. Vane 46 extends outside an exterior of the aircraft and is exposed to external airflow, and housing 50 extends within an interior of the aircraft. External airflow causes vane 46 to rotate with respect to faceplate 48 via a series of bearings within angle of attack sensor 42. Vane 46 rotates based on the angle at which the aircraft is flying relative to the external oncoming airflow. Vane 46 causes rotation of a vane base and vane shaft within housing 50. The vane shaft is coupled to a rotational sensor that measures the local angle of attack or angle of the airflow relative to the fixed aircraft structure. The measured angle of attack is communicated to a flight computer and can be used to generate air data parameters related to the aircraft flight condition.

Figure 4:
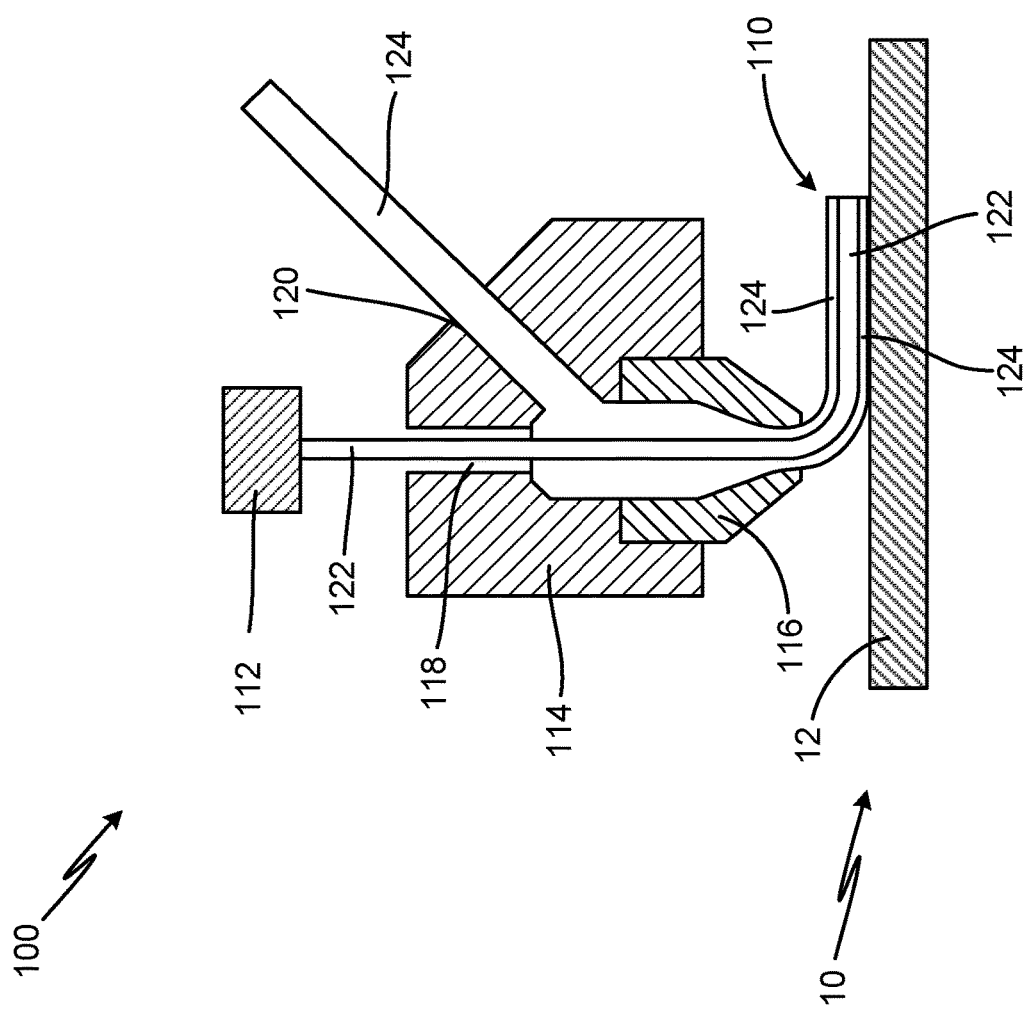
FIG. 4 is a schematic view of a system for forming an additively manufactured heater.

FIG. 4 is a schematic view of system 100 for forming additively manufactured electric resistance heater 110 on body 12 of pitot probe 10. System 100 includes wire-cut mechanism 112, heating zone 114, nozzle 116, first channel 118, and second channel 120. Heater 110 includes heater wire 122 and dielectric material 124.

Pitot probe 10 has the same structure and function as described with respect to FIG. 1. In this embodiment, pitot probe 10 has heater 110 on body 12 of pitot probe 10. Body 12 of pitot probe 10 is a substrate onto which heater 110 is formed via system 100. Body 12 of pitot probe 10 may be formed using any manufacturing technique, such as casting, machining, or additive manufacturing.

System 100 has wire-cut mechanism 112 connected to heating zone 114. In alternate embodiments, system 100 may have multiple wire-cut mechanisms 112. Heating zone 114 is a heating block. Nozzle 116 is connected to heating zone 114. Heating zone 114 is between wire-cut mechanism 112 and nozzle 116. Nozzle 116 is the extrusion head of system 100. Nozzle 116 may be installed in a traditional additive manufacturing system or attached to a robotic arm for additional degrees of freedom. First channel 118 extends through heating zone 114 from wire-cut mechanism to nozzle 116. First channel 118 also extends through nozzle 116. Second channel 120 extends through heating zone 114 into first channel 118.

Heater wire 122 and dielectric material 124 form heater 110. Heater wire 122 extends from wire-cut mechanism into first channel 118 such that heater wire 122 extends into heating zone 114. Heater wire 122 extends through heating zone 114 within first channel 118. Heater wire 122 may be made of copper, nickel, or any other suitable material. Dielectric material 124 enters heating zone 114 at second channel 120. In this embodiment, dielectric material 124 is a thermoplastic filament, such as ABS or Ultem. In alternate embodiments, dielectric material 124 may be any other suitable polymer (such as Teflon and silicone), one or two part epoxies that may require curing (such as thermal or UV curing) after extrusion, or any other suitable dielectric material. In alternate embodiments, dielectric material 124 may be pellets, resin, or composite materials such as ceramics. Dielectric material 124 extends through heating zone 114 within second channel 120 and into first channel 118.

System 100 forms heater 110 onto body 12 of pitot probe 10. During formation of heater 110, pitot probe 10 may be mounted to a robotic arm to increase the complexity and degrees of freedom for applying heater 110. Wire-cut mechanism 112 cuts heater wire 122 at a pre-determined location. Heater wire 122 is fed into heating zone 114 via first channel 118. One or more heater wires 122 may be fed into heating zone 114 and joined to change the density of heater 110 along body 12. For example, the number of heater wires 122 may be increased or decreased to vary heater wattage, mechanical crimps, or other factors for tailoring the heating of heater 110. Dielectric material 124 is fed into heating zone 114 via second channel 124. Heating zone 114 heats heater wire 122 and dielectric material 124. Dielectric material 124 is heated to increase fluidity of dielectric material 124. For example, heated dielectric material 124 is a molten polymer. In embodiments where dielectric material is a resin, heated dielectric material may be a liquid resin. Heated, or melted, dielectric material 124 enters first channel 118. As such, heater wire 122 and dielectric material 124 come into contact within heating zone 114 such that heater wire 122 is coaxially fed into heated dielectric material 124. Heater wire 122 and dielectric material 124 move into nozzle 116.

Heater wire 122 and dielectric material 124 are coaxially co-extruded from heating zone 114 through nozzle 116 and onto body 12, which forms heater 110. As such, heater 110 is formed by heater wire 122 and dielectric material 124. Heater wire 122 is fully encapsulated by dielectric material 124 as heater wire 122 and dielectric material 124 exit nozzle 116. Heater 110 is deposited onto body 12 along a pre-programmed path to achieve desired heating of pitot probe 10. For example, the location and density of heater 110 may be tailored to achieve more or less heat in various areas of pitot probe 10. Heater 110 can have varying watt density and include cold leads and transitions to change the amount of heat produced by heater 110. The path for extruding heater 110 onto body may be programmed using traditional or custom software.

Pitot probe 10 is installed on an aircraft and subjected to icing conditions during flight. Heater 110 provides heat to body 12 of pitot probe 10 to prevent and remove ice growth. Different regions of pitot probe 10 require different levels of heat. Heater 110 can be additively manufactured onto body 12 exactly where needed to tailor heating of pitot probe 10. For example, heater 110 can be formed closer to tip 20 (shown in FIG. 1).

Traditionally, heaters are brazed or installed into or onto air data probes. As such, manufacturing limitations affect where and how heaters can be placed on the air data probe. Additionally, traditional methods for installing heaters can be expensive and labor-intensive multi-step processes.

Additively manufactured heater 110 provides more flexibility with respect to where heater 110 can be formed on pitot probe 10 and allows for precise tailoring of heat from heater 110 within areas of pitot probe 10 where more or less heat is required. System 100 can be used to automate the method of installing heater 110. Coaxially co-extruding heater wire 122 encased within dielectric material 124 directly onto body 12 allows heater 110 to be formed, deposited, and adhered onto body 12 in a single step. As a result, forming heater 110 is simpler, less labor-intensive, and more cost-effective.

Figure 5:
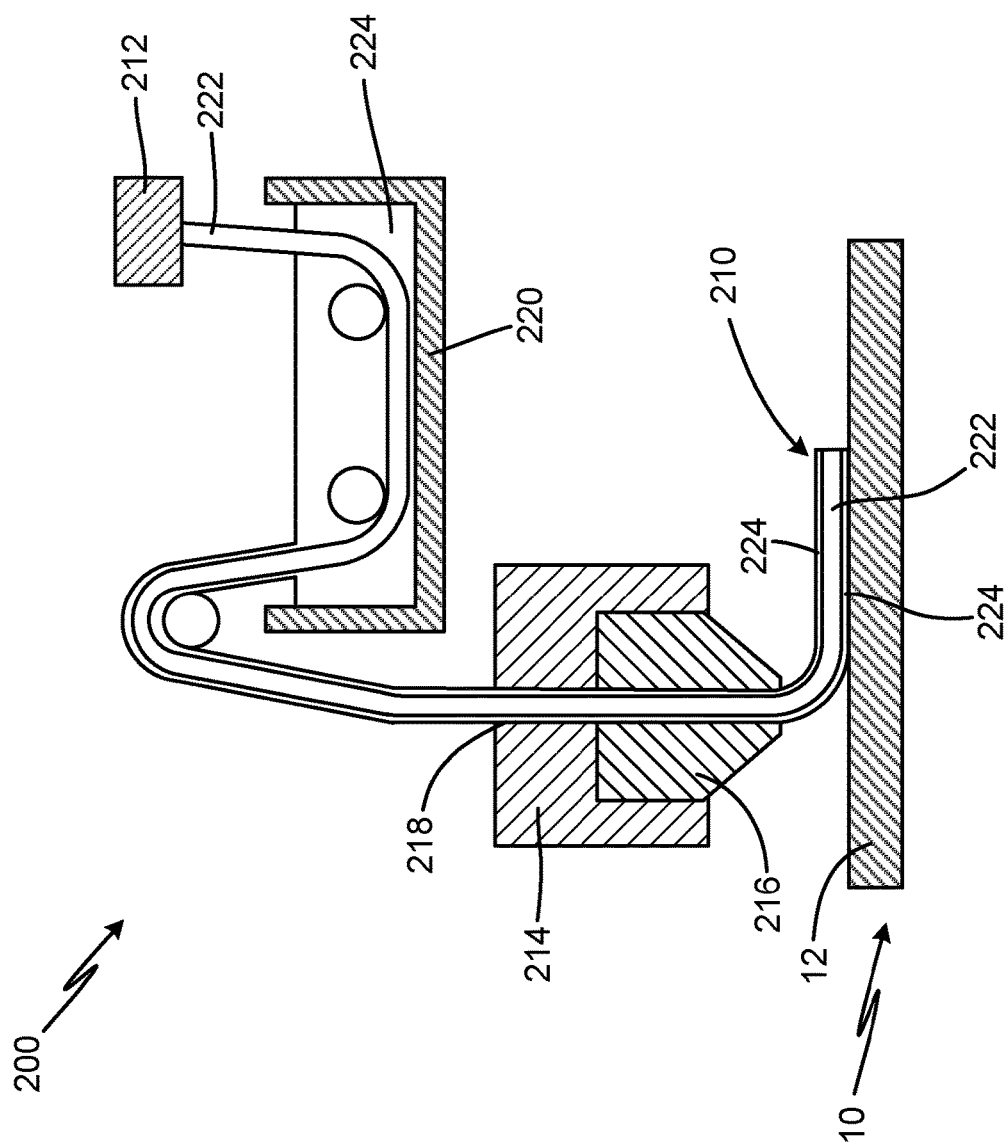
FIG. 5 is a schematic view of a second embodiment of a system for forming an additively manufactured heater.

FIG. 5 is a schematic view of system 200 for forming additively manufactured electric resistance heater 210 on body 12 of pitot probe 10. System 200 includes wire-cut mechanism 212, heating zone 214, nozzle 216, first channel 218, and dielectric pool 220. Heater 210 includes heater wire 222 and dielectric material 224.

Pitot probe 10 has the same structure and function as described with respect to FIG. 1. In this embodiment, pitot probe 10 has heater 210 on body 12 of pitot probe 10. Body 12 of pitot probe 10 is a substrate onto which heater 210 is formed via system 200. Body 12 of pitot probe 10 may be formed using any manufacturing technique, such as casting, machining, or additive manufacturing.

System 200 has wire-cut mechanism 212 connected to heating zone 214. In alternate embodiments, system 200 may have multiple wire-cut mechanisms 212. Heating zone 214 is a heating block. Nozzle 216 is connected to heating zone 214. Heating zone 214 is between wire-cut mechanism 212 and nozzle 216. Nozzle 216 is the extrusion head of system 200. Nozzle 216 may be installed in a traditional additive manufacturing system or attached to a robotic arm for additional degrees of freedom. First channel 218 extends through heating zone 214. Dielectric pool 220 is positioned between wire-cut mechanism 212 and heating zone 214. As such, wire-cut mechanism 212 is connected to heating zone 214 via dielectric pool 220. First channel 218 extends through heating zone 214 from dielectric pool 220 to nozzle 216. First channel 218 also extends through nozzle 216.

Heater wire 222 and dielectric material 224 form heater 210. Heater wire 222 extends from wire-cut mechanism through dielectric pool 220 and into first channel 218 such that heater wire 122 and dielectric material 224 extend into heating zone 214. Heater wire 222 may be made of copper, nickel, or any other suitable material. Dielectric pool 220 contains dielectric material 224. In this embodiment, dielectric material 224 is liquid resin. In alternate embodiments, dielectric material 224 may be any suitable polymer (such as ABS, Ultem, Teflon, and silicone) and dielectric pool 220 may be heated, or dielectric material 224 may be any other suitable dielectric material. In alternate embodiments, dielectric material 224 may be pellets, filament, or composite materials such as ceramics. Heater wire 222 and dielectric material 224 enter at and extend through heating zone 214 within first channel 218.

System 200 forms heater 210 onto body 12 of pitot probe 10. During formation of heater 210, pitot probe 10 may be mounted to a robotic arm to increase the complexity and degrees of freedom for applying heater 210. Wire-cut mechanism 212 cuts heater wire 222 at a pre-determined location. Heater wire 222 is run through dielectric pool 220, and heater wire 222 is coated with dielectric material 224. Heater wire 222 is coaxially within dielectric material 224 when heater wire 22 and dielectric material 224 exit dielectric pool 220. As such, heater wire 222 and dielectric material 224 are coaxially fed into heating zone 214 via first channel 218. One or more heater wires 222 may be joined and fed into dielectric pool 220 to change the density of heater 210 along body 12. For example, the number of heater wires 222 may be increased or decreased to vary heater wattage, mechanical crimps, or other factors for tailoring the heating of heater 110. Heating zone 214 heats heater wire 222 and dielectric material 224, and heater wire 222 and dielectric material 224 move into nozzle 216.

Heater wire 222 and dielectric material 224 are coaxially co-extruded from heating zone 214 through nozzle 216 and onto body 12, which forms heater 210. As such, heater 210 is formed by heater wire 222 and dielectric material 224. Heater wire 222 is fully encapsulated by dielectric material 224 as heater wire 222 and dielectric material 224 exit nozzle 216. Heater 210 is deposited onto body 12 along a pre-programmed path to achieve desired heating of pitot probe 10. For example, the location and density of heater 210 may be tailored to achieve more or less heat in various areas of pitot probe 10. Heater 210 can have varying watt density and include cold leads and transitions to change the amount of heat produced by heater 210. The path for extruding heater 210 onto body may be programmed using traditional or custom software.

Pitot probe 10 is installed on an aircraft and subjected to icing conditions during flight. Heater 210 provides heat to body 12 of pitot probe 10 to prevent and remove ice growth. Different regions of pitot probe 10 require different levels of heat. Heater 210 can be additively manufactured onto body 12 exactly where needed to tailor heating of pitot probe 10. For example, heater 210 can be formed closer to tip 20 (shown in FIG. 1).

Traditionally, heaters are brazed or installed into or onto air data probes. As such, manufacturing limitations affect where and how heaters can be placed on the air data probe. Additionally, traditional methods for installing heaters can be expensive and labor-intensive multi-step processes.

Additively manufactured heater 210 provides more flexibility with respect to where heater 210 can be formed on pitot probe 10 and allows for precise tailoring of heat from heater 210 within areas of pitot probe 10 where more or less heat is required. System 200 can be used to automate the method of installing heater 210. Coaxially co-extruding heater wire 222 encased within dielectric material 224 directly onto body 12 allows heater 210 to be formed, deposited, and adhered onto body 12 in a single step. As a result, forming heater 210 is simpler, less labor-intensive, and more cost-effective.

FIGS. 1-3 illustrate different types of air data probes on which additively manufactured heaters 110 or 210 can be applied. While heaters 110 and 210 have been discussed with respect to pitot probe 10, additively manufactured heaters 110 and 210 can be applied to any air data probe, including pitot probe 10, total air temperature probe 26, angle of attack sensor 42, or any other suitable air data probe. Heaters 110 and 210 can be tailored to achieve the heating needs of the air data probe. For example, heaters 110 and 210 can be formed near inlet scoop 36 (shown in FIG. 2), vane 46 (shown in FIG. 3), or leading edges 22, 38, or 52 (shown in FIGS. 1-3) to provide more heat. Heaters 110 and 210 can also be tailored to provide less heat to trailing edges 24, 40, 54 (shown in FIGS. 1-3). Further, systems 100 and 200 can be used to form heater 110 and 210, respectively, on any other suitable substrate that requires heating.

DISCUSSION OF POSSIBLE EMBODIMENTS

The following are non-exclusive descriptions of possible embodiments of the present invention.

A method for forming a heater on a substrate includes feeding a heater wire into a heating zone, the heater wire being in contact with a dielectric material within the heating zone; and coaxially co-extruding the heater wire and the dielectric material from the heating zone through a nozzle and onto a substrate such that the heater wire and the dielectric material form a heater for heating the substrate.

The method of the preceding paragraph can optionally include, additionally and/or alternatively, any one or more of the following features, configurations and/or additional components:

The heater wire is fully encapsulated by the dielectric material as the heater wire and the dielectric material exit the nozzle.

Cutting the heater wire at a pre-determined location.

Feeding a dielectric material into the heating zone.

The dielectric material is a thermoplastic filament.

Running the heater wire through a dielectric pool, the dielectric pool containing the dielectric material.

The substrate is a body of an air data probe.

The heater is additively manufactured onto the substrate in a single step.

The heater has varying watt density.

The heater includes cold leads.

A system for forming a heater onto a substrate includes a heating zone configured to heat a heater wire and a dielectric material; and a nozzle connected to the heating zone; wherein the heater wire and the dielectric material are coaxially co-extruded from the heating zone through the nozzle and onto the substrate to form a heater for heating the substrate.

The system of the preceding paragraph can optionally include, additionally and/or alternatively, any one or more of the following features, configurations and/or additional components:

The heater wire is fully encapsulated by the dielectric material as the heater wire and the dielectric material exit the nozzle.

A wire-cut mechanism connected to the heating zone, wherein the wire-cut mechanism is configured to cut the heater wire.

A dielectric pool positioned between the wire-cut mechanism and the heating zone.

A first channel extends through the heating zone, the heater wire extending through the heating zone within the first channel and a second channel extends through the heating zone, a dielectric material entering the heating zone within the second channel.

The dielectric material is a thermoplastic filament.

The substrate is a body of an air data probe.

The heater is additively manufactured onto the substrate in a single step.

The heater has varying watt density.

The heater includes cold leads.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a heater on an air data probe, the method comprising:
    feeding a heater wire into a heating zone, the heater wire being in contact with a dielectric material within the heating zone; and
    coaxially co-extruding the heater wire and the dielectric material from the heating zone through a single nozzle and onto a body of the air data probe such that the heater wire and the dielectric material form a heater for heating the body of the air data probe;
    wherein the heater wire is fully encapsulated by the dielectric material as the heater wire and the dielectric material exit the nozzle; and
    wherein the heater is additively manufactured onto the body of the air data probe in a single step.

2. The method of claim 1, further comprising cutting the heater wire at a pre-determined location.

3. The method of claim 1, further comprising feeding a dielectric material into the heating zone.

4. The method of claim 3, wherein the dielectric material is a thermoplastic filament.

5. The method of claim 1, further comprising running the heater wire through a dielectric pool, the dielectric pool containing the dielectric material.

6. The method of claim 1, wherein the heater has varying watt density.

7. The method of claim 1, wherein the heater includes cold leads.

8. A system for forming a heater onto an air data probe, the system comprising:
    a heating zone configured to heat a heater wire and a dielectric material; and
    a nozzle connected to the heating zone;
    wherein the heater wire and the dielectric material are coaxially co-extruded from the heating zone through the nozzle and onto a body of the air data probe to form a heater for heating the body of the air data probe, wherein the heater wire is fully encapsulated by the dielectric material as the heater wire and the dielectric material exit the nozzle; and
    wherein the heater is additively manufactured onto the body of the air data probe in a single step.

9. The system of claim 8, further comprising a wire-cut mechanism connected to the heating zone, wherein the wire-cut mechanism is configured to cut the heater wire.

10. The system of claim 9, further comprising a dielectric pool positioned between the wire-cut mechanism and the heating zone.

11. The system of claim 8, wherein a first channel extends through the heating zone, the heater wire extending through the heating zone within the first channel and a second channel extends through the heating zone, a dielectric material entering the heating zone within the second channel.

12. The system of claim 11, wherein the dielectric material is a thermoplastic filament.

13. The system of claim 8, wherein the heater has varying watt density.

14. The system of claim 8, wherein the heater includes cold leads.

* * * * *